United States Patent [19]

Küchler

[11] Patent Number: 4,635,252
[45] Date of Patent: Jan. 6, 1987

[54] CONFERENCE CIRCUIT FOR DIGITAL COMMUNICATION SYSTEMS

[75] Inventor: Heinrich Küchler, Berlin, Fed. Rep. of Germany

[73] Assignee: Siemens Aktiengesellschaft, Berlin and Munich, Fed. Rep. of Germany

[21] Appl. No.: 757,656

[22] Filed: Jul. 22, 1985

[51] Int. Cl.$^4$ ............................................. H04Q 11/04
[52] U.S. Cl. ..................................... 370/62; 370/32.1; 379/202
[58] Field of Search ............................ 370/62, 24, 32; 179/18 BC, 170.2

[56] References Cited

U.S. PATENT DOCUMENTS 4,482,998  11/1984  Marouf et al. ......................... 370/62
4,488,291  12/1984  Eschmann et al. ..................... 370/62
4,535,445   8/1985  Lane et al. ............................ 370/62

Primary Examiner—Douglas W. Olms
Assistant Examiner—Kenneth I. Rokoff
Attorney, Agent, or Firm—Hill, Van Santen, Steadman & Simpson

[57] ABSTRACT

A circuit arrangement for conference circuits in digital communications systems, particularly in PCM telephone systems, provide digitized voice signals of the conference participants which are added in the conference circuit and are transmitted to all conference participants minus a voice signal generated by the respective participant. In the conference circuit, linear samples are transmitted to a subtractor in a frame-delayed manner by an intermediate memory and are compared by a transverse filter to the sum of all preceding samples respectively multiplied by a correction value derived dependent on the phase position to the sum of a momentary sample. As a result, each conference subscriber receives the sum of the voice signal of all conference subscribers minus his own voice signal, whereby the echo signals of the conference participants are suppressed except for one's own echo signal.

2 Claims, 1 Drawing Figure

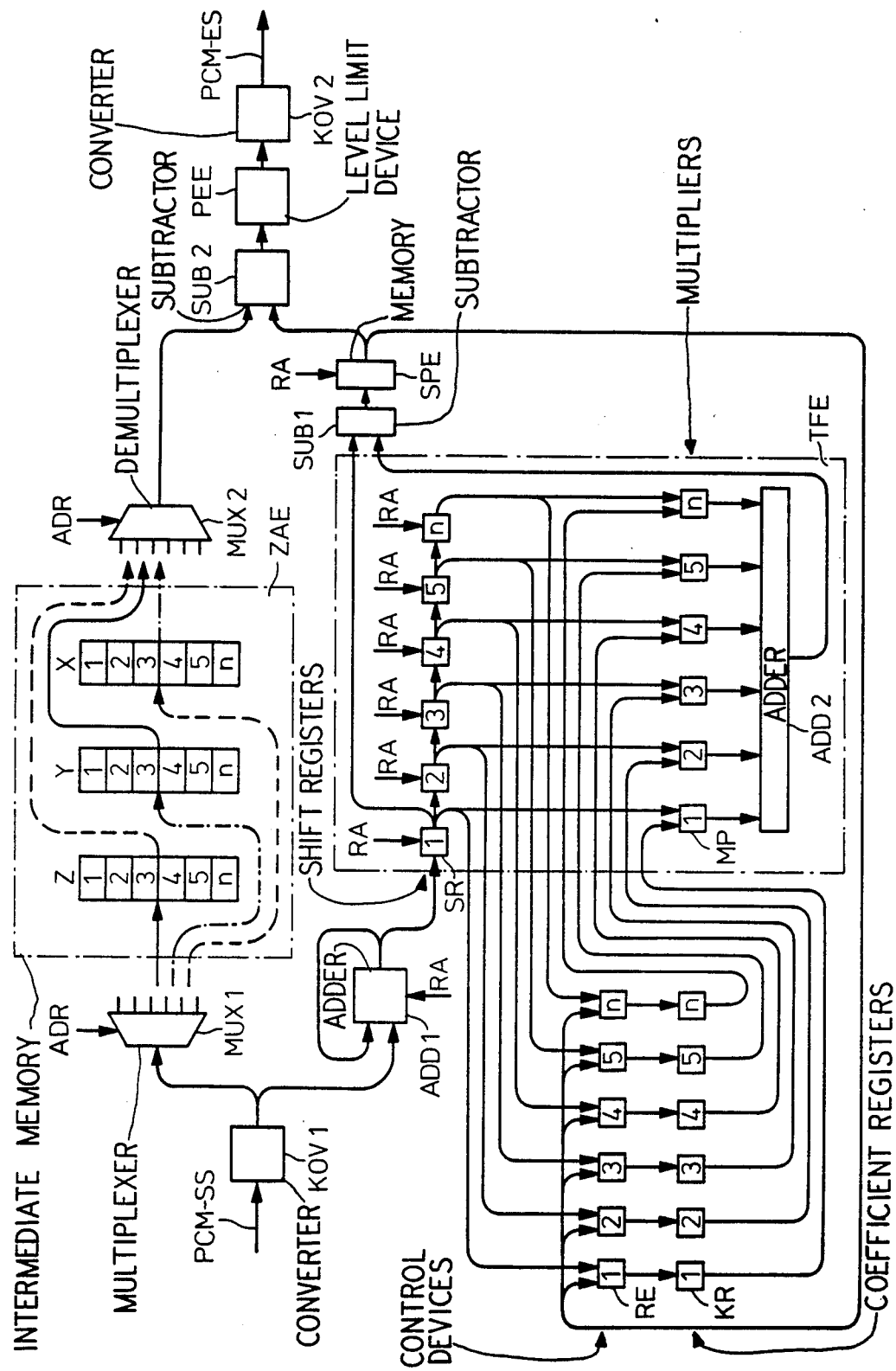

CONFERENCE CIRCUIT FOR DIGITAL COMMUNICATION SYSTEMS

BACKGROUND OF THE INVENTION

1. Field of the Invention

The present invention relates to a circuit arrangement for conference circuits in digital communications systems, particularly in PCM telephone systems in which digitized voice signals of the conference participants are added in the conference circuit and are transmittable to all conference participants minus one's own voice signal generated by the respective conference circuit participants themselves.

2. Description of the Prior Art

In conference circuits defined in such a manner, therefore, the voice signals of the three through n conference participants are added and are transmitted to all conference participants minus the voice signal emitted by the individual conference participants. Depending on the type of length of the transmission link between the individual conference participants, however, particularly given interconnection of mixed analog and digital transmission links in conjunction with non-adapted lines, disturbing echo signals occur which greatly deteriorate the comprehension of the transmitted useful signals (voice signals). Since the echo signals of the conference participants add in the same manner as their useful signals and the sum signal, the useful signals and the echo signals of all participants, is transmitted to every individual conference participant, the echo signals can assume the order of magnitude of the useful signals relatively quickly and, therefore, lead to total incomprehensibility of the voice signals for the individual conference participants.

Numerous methods for echo suppression are known for the elimination of these disturbing influences due to the echo signals and, therefore, for example, the use of various echo barriers and, to an increasing degree, the automatic compensation of echo signals by so-called echo compensators. All of the methods provide that the echo suppression occurs immediately at each individual conference subscriber location and, consequently, considerable preperformance must be undertaken for connections having many conference participants.

SUMMARY OF THE INVENTION

The object of the present invention is to provide for considerably reducing the expense for echo compensation and, in particular for conferences having a great number of conference participants, to provide a circuit arrangement wherein the echo compensation can optimally occur regardless of the number of conference participants and their variously-constituted transmission links.

The foregoing object is achieved in a circuit arrangement for conference connections in digital communications systems, particularly PCM telephone systems, wherein digitized voice signals of the conference participants are added in the conference circuit and are transmittable to all conference participants minus the voice signal generated by the respective conference participants themselves, is particularly characterized by (1) the conference circuit comprises a first converter device for recoding voice signals digitized at the transmission side into linear samples, the output of the first converter device transmitting the recoded samples to the input of the multiplexer device and a first adder device, (2) the multiplexer device is in communication with an intermediate memory which accepts the samples framewise and which, by means of a demultiplexer, transmits the samples delayed by two frames to the input of a second subtraction device, (3) the first adder is connected at its output to a transversal filter such that the sum of a momentary sample of all conference participants can be compared by a first subtraction device to a number of sums of respectively preceding samples of all conference participants, the number of sums corresponding to the number of frames, whereby the sum of the momentary sample and the sum of the respectively preceding samples of the conference participants, dependent on the phase position relative to the sum of the momentary sample of all conference participants, multiplied by a correction value determined by a respective control device and stored in a correspondingly-assigned coefficient register, together with the corresponding sum of the momentary sample or, respectively, with the sum of the respectively preceding samples of a second adder which adds all the sum signals are supplied to the transversal filter device, (4) the first subtraction device is in communication with a memory whose output signal differs between the sum of the momentary sample and the sums of all preceding samples respectively multiplied by the corresponding correction value is supplied to the second subtraction device and to the control devices, and (5) the conference circuit comprises a second converter device for recoding the linear samples into voice signals digitized at the receiving side, the input of the second converter device being connected to the output of the second subtraction device.

The circuit arrangement, according to the present invention, therefore provides a centrally disposed intermediate memory for all conference participants which, in combination with the transversal filter likewise provided in common for all conference participants, sees to it that, in addition to the sum of the voice signals of all conference participants, each conference participant only receives his own line-conditioned echo signal transmitted to him. It is therewith guaranteed that the otherwise usual summing of the echo signals is suppressed and the disturbing influence for each individual conference participant is restricted to his own echo signal. It is to be viewed as essential for the invention that this arrangement is not to be decentrally provided for every individual conference participant, but is centrally used for a conference call independently of the number of conference participants and their transmission links.

In accordance with an advantageous feature of the invention, it is provided that a setting device for the level limit value is interconnected between the second subtraction device and the second converter device, so that the sum signals which may be too great under certain conditions due to the summing can be limited to a defined, allowed level value.

BRIEF DESCRIPTION OF THE DRAWING

Other objects, features and advantages of the invention will be best understood from the following detailed description, taken in conjunction with the accompanying drawing, on which there is a single FIGURE which is a schematic representation of an exemplary embodiment of the invention in which the switch devices necessary for an understanding of the invention are shown.

DESCRIPTION OF THE PREFERRED EMBODIMENTS

The conference circuit is disposed between a so-called highway, whereby the voice signals PCM-SS digitized at the transmitting side represent the input and the voice signals PCM-ES digitized at the receiving side represent the output of the conference circuit. The voice signals of all conference participants to be connected to one another in the conference circuit are on this PCM highway. The momentary samples of the voice signals of the conference participants are thereby transmitted in serial succession within specific time slots. The time for the transmission of a sample of all conference subscribers is referred to as a frame cycle. The frame cycle cylically repeats in accordance with the sampling rate.

The voice signals PCM-SS digitized at the transmitting side are transmitted to a first converter KOV1 and are recoded into linear samples by the converter KOV1. The output of the first converter KOV1 is connected to the input of a multiplexer MUX1. The multiplexer MUX1 writes the samples which are transmitted from the first converter KOB1 into the memory cells Z1 ... Zn, Y1 ... Yn, X1 ... Xn of an intermediate memory ZAE. The multiplexer MUX1 is thereby controlled by a control line ADR that the memory cells Z1 ... Zn, Y1 ... Yn or X1 ... Xn are rotatingly written in a frame-dependent manner, i.e. when the samples are written into the memory cells Z1 ... Zn, the samples of the first preceding frame are stored in the memory cells Y1 ... Yn and the samples of the second preceding frame are stored in the memory cells X1 ... Xn. When the memory cells X1 ... Xn are written with samples, then the samples of the first frame previous thereto are stored in the memory cells Y1 ... Yn and the samples of the second frame previous are stored in the memory cells Z1 ... Zn, etc.

At the same time, the multiplexer MUX1 is controlled by the control line ADR so that the samples are always deposited in a time slot suitable manner into the corresponding memory cells Z ..., Y ..., X ... of the intermediate memory ZAE, i.e. that the samples from the conference participants on the time slot 1 of the PCM highway always lie in the memory cells Z1, Y1 and X1 and the samples of the conference subscriber of the time slot 2 always lie on the memory locations Z2, Y2 and X2, etc.

Further, the output of a demultiplexer MUX2 is connected to a subtractor SUB2. The demultiplexer MUX2 reads the samples from the memory cells Z1 ... Zn, Y1 ... Yn, X1 ... Xn of the intermediate memory ZAE and transfers the same to the subtractor SUB2. The subtractor SUB2 is controlled by the control line ADR such that the memory cells Z1 ... Zn, Y1 ... Yn and X1 ... Xn are read rotationally in a frame-dependent manner, i.e. when the demultiplexer MUX2 reads the memory cells Z1 ... Zn, the memory cells X1 ... Xn are simultaneously overwritten by way of the multiplexer MUX1. When, by contrast, the memory cells Y1 ... Yn are read by the demultiplexer MUX2, the memory cells Z1 ... Zn are simultaneously written by way of the multiplexer MUX1, etc. The demultiplexer MUX2 always reads the samples of the frame which is not transmitted at the same time but, rather, of the second frame previous. The demultiplexer MUX2 is thereby controlled by the control line ADR so that the samples are always read in a time slot suitable manner out of the corresponding memory cells Z ... Y ... and X ... of the intermediate memory ZAE, i.e. the sample of the first time slot of the PCM highway is always read from the memory cells Z1, Y1 and X1 and the sample of the second time slot is always read from the memory cells Z2, Y2 and X2, etc.

Further the output of the converter KOV1 is connected to the first input of an adder ADD1, whereby the adder represents an accumulating adder whose output is connected to its second input. The first adder ADD1 accordingly adds the samples transferred from the output of the first converter KOV1 in succession. The adder ADD1 is always reset with a control line RA when the sum of all samples of the conference participants is at the output of the adder ADD1. The output of the adder ADD1 is connected to a transverse filter TFE which, among other things, contains shift registers SR1 ... SRn and multipliers MP1 ... MPn. The shift registers are initiated by the control lines RA to store the samples applied to their inputs, so that, at every frame change, the respective momentary SUM signal at the output of the adder ADD1 is transferred into the first shift register SR1 and with the further frame change it is restored into the following shift registers SR2, SR3 ... SRn. Further, control devices RE1 ... REn in communication with the transverse filter TFE are provided, their respective second inputs being connected to the output of the corresponding shift register SR1 ... SRn. Further, the first inputs of all control devices RE1 ... REn are connected in common to the output of a memory SPE. The output of the control device RE1 ... REn simultaneously forms the input of a corresponding coefficient register KR1 ... KRn. The control devices RE1 ... REn thereby compare the samples at their inputs. Depending on whether the results are positive or negative or, respectively, the samples are equiphase or not equiphase, the content of the appertaining coefficient register KR1 ... KRn is incremented or decremented by a small amount. The contents of the coefficient registers KR1 ... KRn are fed to the multipliers MP1 ... MPn of the transverse filter TFE, their respective second input being connected to the output of the corresponding shift register SR1 ... SRn. The multipliers MP execute a multiplication of the content of the shift register SR with the content of the respective coefficient register KR and apply the result to their outputs which simultaneously form the inputs of an adder ADD2 in the transverse filter TFE. The adder ADD2 adds the output values of the multipliers and applies the result to its output.

Further, the first input of a subtractor SUB1 is connected to the output of the shift register SR1 so that the sum sample of the conference participants is applied to the first input of the subtractor SUB1. The second input of the subtractor SUB1 is connected to the output of the adder ADD2 and contains the so-called echo correction signal. The subtractor SUB1 subtracts the echo correction signal from the sum sample so that the corresponding differential signal appears at the output, this differential signal being intermediately stored in the following memory SPE and, in turn, being transmitted by way of the output to the respective control device RE1 ... REn.

Further, the inputs of the subtractor SUB2 are connected both to the output of the memory SPE and the output of the demultiplexer MUX2. The subtractor SUB2 subtracts the time slot suitable sample of the individual conference subscriber from the value, the sum signal of all conference subscribers, permanently transmitted to it by way of a frame, the time slot suitable sample being transmitted to the subtractor SUB2 from the demultiplexer MUX2. The result is applied to the output of the subtractor SUB2. The subtractor SUB2 is followed by a level limit value setting device PEE which reduces the sum signals which may be too great under certain conditions due to the summing to, for example, the level values allowed by the CCITT.

From the level limit value setting device, the voice signal which may be corrected proceeds to a converter KOV2 which converts the linear samples into the voice signals PCM-SE digitized at the receiving side. Therefore, every conference participant receives the sum signals of all conference participants minus his self-generated voice signals, whereby the echo signals of the conference participants are eliminated except for one's own echo signal.

For further explanation of the exemplary embodiment, modules which are suitable for the individual function units are set forth below.

After the serially incoming PCM signal has been converted, for example, in a shift register (Texas Instruments LS 164) into an 8-bit data word as a voice signal PCM-SS digitized at the transmitting side, the linearization of this signal into a 13-bit signal can occur by the first converter KOV1 by way of two programmable read only memories (PROMs) having the designation AMD 27 527. Subsequently, this 13-bit signal is stored in an intermediate memory ZAE having two random access memories (RAMs), as may be provided by the Toshiba 20 16, and is in turn read out two frames later. The time delay occurs by way of a suitable address sequence. The write and read addresses are alternately applied to the RAMs. This can be realized by way of two 8 bit counters having parallel output registers 2 modules, (Texas Instruments LS 590) in conjunction with 8 two-to-one multiplexers (Texas Instruments LS 606) or, respectively, with a 256×8 PROM (AMD, 275 15). The 13-bit signals succeeding one another in such a manner are subsequently summed up in the first adder ADD1 which is formed of standard circuits (four modules, Texas Instruments, LS 381, one Texas Instruments module LS182). The sub-sum signals existing in two's complement are converted by two PROMs (2 modules, AMD 27 537) into the representational form of the input signal according to amount and operational sign and are returned to the first adder ADD1 at a suitable time.

The first and second subtractors SUB1, SUB2, are likewise composed of standard circuits (four modules, Texas Instruments LS381, one module, Texas Instruments LS182), whereas the converter KOV2 which converts the 15-bit wide sum signal into an 8-bit signal is formed by a 32k×8 PROM (Toshiba TMM 23 256 P). When the first adder ADD1 supplies a signal whose amount is greater than 12-bits then, two frames before this signal arrives at the level limit value setting device PEE, the overflow is intermediately stored in a shift register (Texas Instruments LS164). The outputs of the shift register specify the attenuation level. To this end, the most recent and the oldest signal are weighted with the value 1, the second most recent and the second oldest signal are weighted with the value 2, and the center signal is weighted with the value 3. The sum of these weightings defines the attenuation level which is realized by an 8k×8 PROM (Toshiba TMM 23 64 P).

In order to convert the 8-bit signal into the serial voice signal PCM-ES digitized at the receiving side, a multiplexer (Texas Instruments LS356) can be utilized.

In the transverse filter TFE, the sum signals coming from the adder ADD1 are written into two RAMs (Toshiba TM 20 18) and are transmitted frame-by-frame to the multipliers MP and to the adder AD2 which are realized by a module (TRW TDC 10 43).

The coefficient register KR is formed by a RAM (Toshiba TMM 2018) which contains the 1023 coefficients. Signal and coefficients are then offset relative to one another by one place in every following frame, whereby the RAMs in the transverse filter TFE behave like a shift register.

The new coefficients are generated by the control devices RE by way of a counter (Texas Instruments AS 869) and a control logic (Fairchild AS 86, AS 00), whereby the adaptation of the buses occurs by way of flip-flops (Fairchild AS 74) and latches with resets (Texas Instruments AS 873). The conversion of the signal existing from the first subtractor SUB1 from representation in two's complement into a representation according to an amount and operational signal is realized by two 1k×8 PROMs (ADM 27 537) or the memory SPE.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for conference connections in digital communications systems, particularly in PCM telephone systems, for interposition in a -PCM highway, wherein digitized voice signals of the conference participants are added in the conference circuit and are transmittable to all conference participants minus the voice signal generated by the respective conference participants, comprising:

a first converter device for receiving and recoding voice signals at the transmitting side into linear samples;

a first multiplexer connected to said first converter;

a first adder connected to said first converter;

an intermediate memory connected to said multiplexer for accepting the recoded samples frame-by-frame;

first and second subtractors;

a demultiplexer connected between said intermediate memory and said second subtractor for transmitting samples delayed by two frames to said second subtractor;

a transverse filter connected to said first adder and to said first subtractor;

a plurality of control devices connected to said transverse filter and a plurality of coefficient registers respectively connected to said control devices and connected to said transverse filter;

said transverse filter comprising a second adder and operable to provide that the sum of a momentary sample of all conference participants are compared by said first subtractor to a number of sums of respectively preceding samples of all conference participants, the number of sums corresponding to the number of frames, whereby the sum of the momentary sample and the sum of the respectively preceding samples of the conference participants, dependent on the phase position relative to the sum of the momentary sample of all conference participants, multiplied by a correction value determined by a respective one of said control devices and stored in the respective coefficient register together with the corresponding sum of the momentary sample or, respectively, with the sum of the respectively preceding samples of said second adder adding all sum signals, are supplied to said transverse filter;

a memory connected between said first and second subtractors and connected to said control devices and operable to provide an output signal which is the difference between the sum of the momentary sample and the sum of all preceding samples respectively multiplied by the corresponding correction value; and a second converter for recoding the linear samples into digitized voice signals.

2. The circuit arrangement of claim 1, and further comprising:

a level limit value setting device connected between said second subtractor and said second converter.

* * * * *